(12) United States Patent
Rohder (10) Patent No.: US 11,519,524 B2
(45) Date of Patent: Dec. 6, 2022

(54) BRACKET ASSEMBLY FOR CABLE INSTALLATIONS

(71) Applicant: Panduit Corp., Tinley Park, IL (US)

(72) Inventor: Brian K. Rohder, Plainfield, IL (US)

(73) Assignee: Panduit Corp., Tinley Park, IL (US)

(*) Notice: Subject to any disclaimer, the term of this patent is extended or adjusted under 35 U.S.C. 154(b) by 0 days.

(21) Appl. No.: 17/230,355

(22) Filed: Apr. 14, 2021

(65) Prior Publication Data

US 2021/0332912 A1 Oct. 28, 2021

Related U.S. Application Data

(60) Provisional application No. 63/015,764, filed on Apr. 27, 2020.

(51) Int. Cl.
*F16L 3/137* (2006.01)
*H02G 3/04* (2006.01)

(52) U.S. Cl.
CPC .......... *F16L 3/137* (2013.01); *H02G 3/0456* (2013.01)

(58) Field of Classification Search
CPC ..... F16L 3/137; F16L 3/24; F16L 3/14; F16L 3/245; H02G 3/0456; H02G 3/32
See application file for complete search history.

(56) References Cited

U.S. PATENT DOCUMENTS

| | | |
|---|---|---|
| 656,274 A | 8/1900 | Streeter |
| 919,558 A | 4/1909 | Doran |
| 2,470,992 A | 5/1949 | Kindorf et al. |
| 2,551,146 A | 5/1951 | Marincic |
| 2,712,917 A | 7/1955 | Flora et al. |
| 3,053,494 A | 9/1962 | Stoll |
| 3,216,685 A | 11/1965 | Raymond |
| 3,667,711 A | 6/1972 | Kissel |
| 4,369,945 A | 1/1983 | Mantoan et al. |
| 4,440,374 A | 4/1984 | Achille |
| 5,595,363 A | 1/1997 | De Leebeeck |
| 6,643,900 B2 | 11/2003 | Jährling |
| 8,480,041 B2 | 7/2013 | Myers |
| 8,931,747 B2 | 1/2015 | Davis |

(Continued)

FOREIGN PATENT DOCUMENTS

| | | | | |
|---|---|---|---|---|
| AU | 2015236429 B2 * | 4/2018 | ............... | E06C 7/14 |
| WO | WO-2014133935 A1 * | 9/2014 | ............. | B66B 23/12 |

OTHER PUBLICATIONS

Eaton Cable Support Systems B-Line (CTME-13) Catalog 2013 (Year: 2013).*

*Primary Examiner* — Terrell L McKinnon
*Assistant Examiner* — Ding Y Tan
(74) *Attorney, Agent, or Firm* — Christopher S. Clancy; James H. Williams; Aimee E. McVady (57) ABSTRACT

A bracket assembly that secures a cable to a ladder rung with first and second beam flanges extending from a beam web. The bracket assembly includes a bracket and a tether connected to the bracket. The bracket has a rung attachment portion configured to receive the second beam flange and a cable attachment portion extending from the rung attachment portion. The tether has a retention pin. The tether is slidable between an initial position and a latched position. In the latched position, the retention pin moves into engagement with the rung attachment portion to engage the second beam flange thereby latching the ladder rung to the bracket assembly.

14 Claims, 11 Drawing Sheets

(56) References Cited

U.S. PATENT DOCUMENTS

| | | | |
|---|---|---|---|
| 9,121,528 B2 * | 9/2015 | Foreman | F16L 3/2334 |
| 9,238,299 B2 | 1/2016 | Noah | |
| 9,309,719 B2 | 4/2016 | Sylvester et al. | |
| 9,548,598 B2 | 1/2017 | Tally et al. | |
| 9,587,433 B2 | 3/2017 | Sylvester et al. | |
| 9,802,743 B2 * | 10/2017 | Foreman | F16L 3/2334 |
| 9,882,365 B2 | 1/2018 | Sylvester et al. | |
| 10,053,268 B1 * | 8/2018 | Sickenberger | B65D 63/18 |
| 10,246,941 B2 | 4/2019 | Sylvester et al. | |
| 10,253,905 B2 | 4/2019 | Martin | |
| 10,407,985 B2 | 9/2019 | Sylvester et al. | |
| 2013/0160246 A1 * | 6/2013 | Hajduch | F16B 5/0685 |
| | | | 24/16 PB |
| 2014/0082923 A1 * | 3/2014 | Owen | F16L 3/137 |
| | | | 29/525.08 |
| 2017/0317480 A1 * | 11/2017 | Rouleau | H02G 3/32 |
| 2018/0111731 A1 * | 4/2018 | Sylvester | B65D 63/1063 |

\* cited by examiner

BRACKET ASSEMBLY FOR CABLE INSTALLATIONS

CROSS-REFERENCE TO RELATED APPLICATION

This application claims benefit to U.S. Provisional Patent Application No. 63/015,764, filed on Apr. 27, 2020, the entirety of which is hereby incorporated by reference herein.

TECHNICAL FIELD

The present application generally relates to a bracket for securing cables to the rungs of a ladder rack.

BACKGROUND

Electrical cables or bundles of cables are supported by ladder racks. Conventional cable installations in ladder racks require small cables or small bundles of cables to be secured to the ladder rungs with cable ties.

SUMMARY

In one example, a bracket assembly secures a cable to a ladder rung. The ladder rung has first and second beam flanges extending from a beam web. The bracket assembly comprises a bracket and a tether connected to the bracket. The bracket has a rung attachment portion configured to receive the second beam flange and a cable attachment portion extending from the rung attachment portion for securing a cable tie. The tether is slidable between an initial position and a latched position. The tether having a retention pin, wherein in the latched position, the retention pin moves into engagement with the rung attachment portion, to engage the second beam flange thereby latching the ladder rung to the bracket assembly.

In another example, a bracket assembly secures a cable to a ladder rung having upper and lower beam flanges each having first and second beam portions on opposite sides of a vertical beam web form. The bracket assembly comprises a bracket with a rung attachment portion, a ratchet passageway, a retention slot, and a cable attachment portion. The rung attachment portion has a retention hook to retain a first beam portion of the lower beam flange of the ladder rung. The ratchet passageway is formed below the rung attachment portion and extending through the bracket. The retention slot is formed parallel to the ratchet passageway and adjacent the rung attachment portion. The cable attachment portion extends from the rung attachment portion to secure the cable tie and to secure a cable generally perpendicular to the ladder rung. The bracket assembly also includes a tether slidable relative to the bracket between an unlatched position and a latched position. The tether comprises a tether body having a plurality of teeth formed to engage ratchet passageway and a tether retention pin formed at a first end of the tether body. The tether body is installed through the ratchet passageway. In the latched position, the tether retention pin extends through the retention slot in the bracket to retain a second beam portion of the lower beam flange of the ladder rung, thereby latching the bracket assembly to the ladder rung.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Cable installations in ladder racks require small cables or small bundles of cables to be secured to the ladder rungs with cable ties. The cable ties are either secured around the ladder rungs and cables at a 45-degree angle across the cables or a 90-degree, figure eight configuration around the cables. The 45-degree angle cable tie configuration has a tendency of cutting the cable insulation with the edge of the cable tie. To prevent this abrasion by the cable tie, additional tie coatings or sleeving needs to be utilized to cushion the edge of the cable tie against the cable, which increases costs and installation time. The figure eight configuration is a more complex installation and therefore requires additional installation time which also increases costs.

The bracket assembly 10 of the present application allows a cable tie to be quickly and easily secured around the cable at 90-degrees while securing the cable to the ladder rung 12, without the additional time or cost for complex installation.

Figure 1:
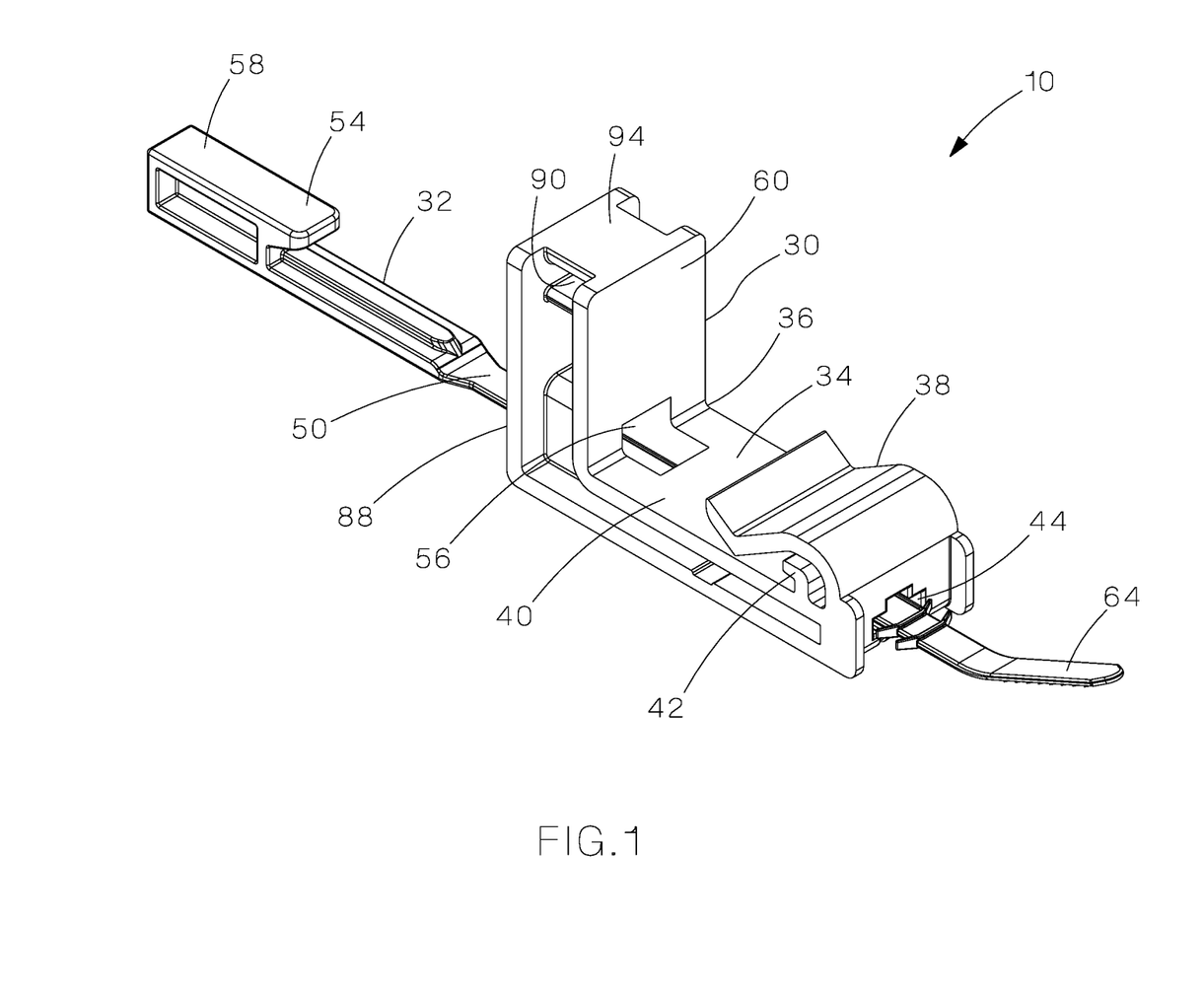
FIG. 1 illustrates a perspective view of the bracket assembly for cable management according to one non-limiting exemplary embodiment of the present disclosure showing the bracket assembly in an initial pre-assembled position.
Figure 2:
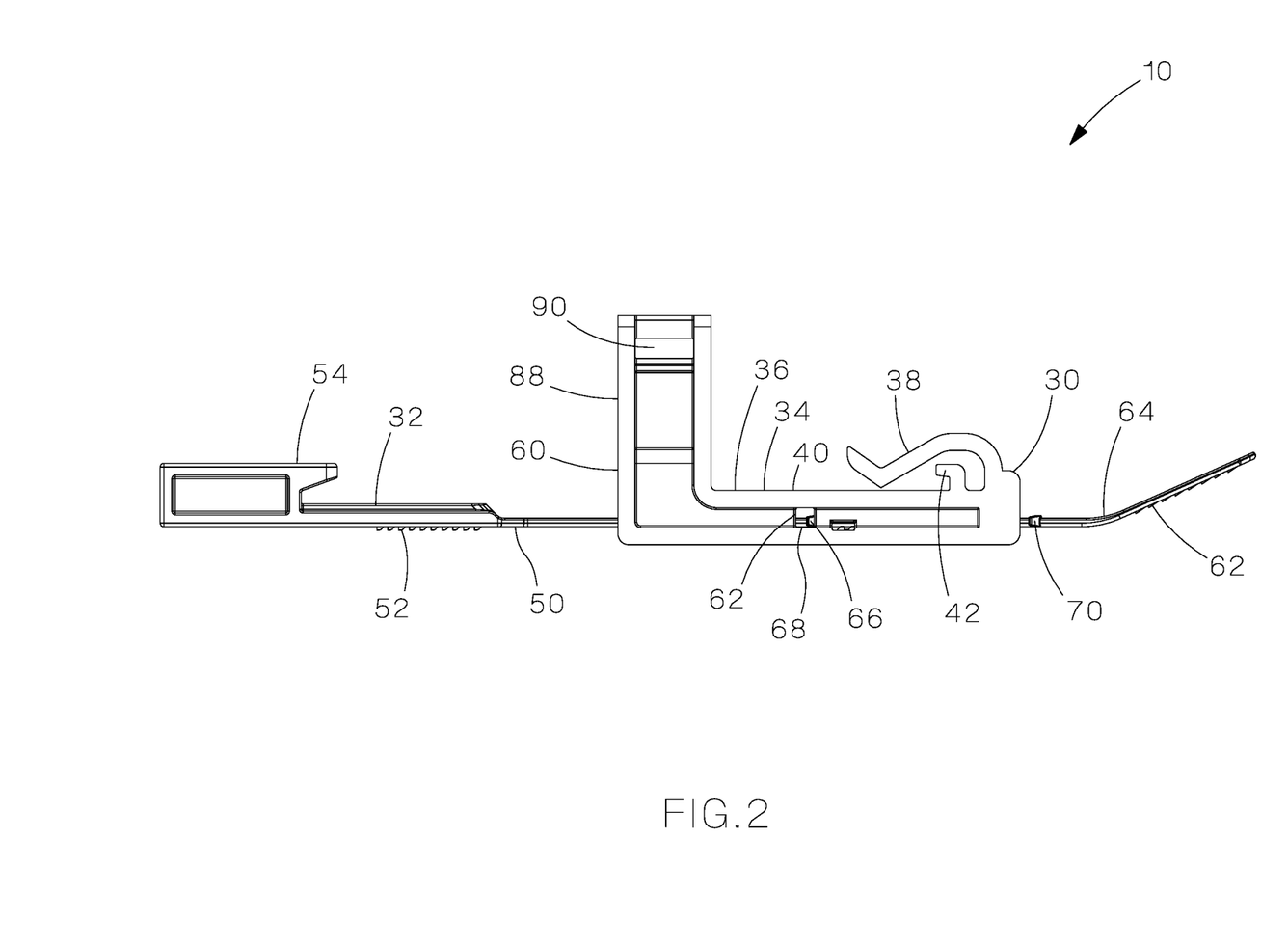
FIG. 2 is a side view of FIG. 1 showing the bracket assembly in the initial pre-assembled position.

FIGS. 1-2 illustrates a bracket assembly 10 prior to being installed on a ladder rung 12. As shown in FIGS. 3-10, the bracket assembly 10 can be easily snapped, positioned and secured onto an I-beam style ladder rung 12 to secure the cable to the ladder rung 12.

Each I-beam style ladder rung 12 is formed of a generally vertical web 20, and generally horizontal upper and lower or first and second beam flanges 22, 24, respectively. The upper beam flange 22 includes upper beam portions 26A, 26B extending from opposite sides of the vertical web 20. Similarly, the lower beam flange 24 has lower beam portions 28A, 28B, extending opposite the vertical web 20. However, the ladder rung 12 may have other beam configurations.

The bracket assembly 10 is a two-piece assembly having a bracket 30 and a tether 32. FIGS. 1-2 illustrate the bracket assembly 10 in an initial pre-assembled position prior to the bracket assembly 10 being secured on the ladder rack rung 12. The bracket 30 and tether 32 may be formed of plastic or nylon, or any suitable material. The bracket assembly 10 is configured to attach to the ladder rung 12 without the need of additional fasteners.

The bracket 30 has a rung attachment portion 34 formed as a channel 36 for retaining the lower beam flange 24 of the ladder rung 12.

Figure 3:
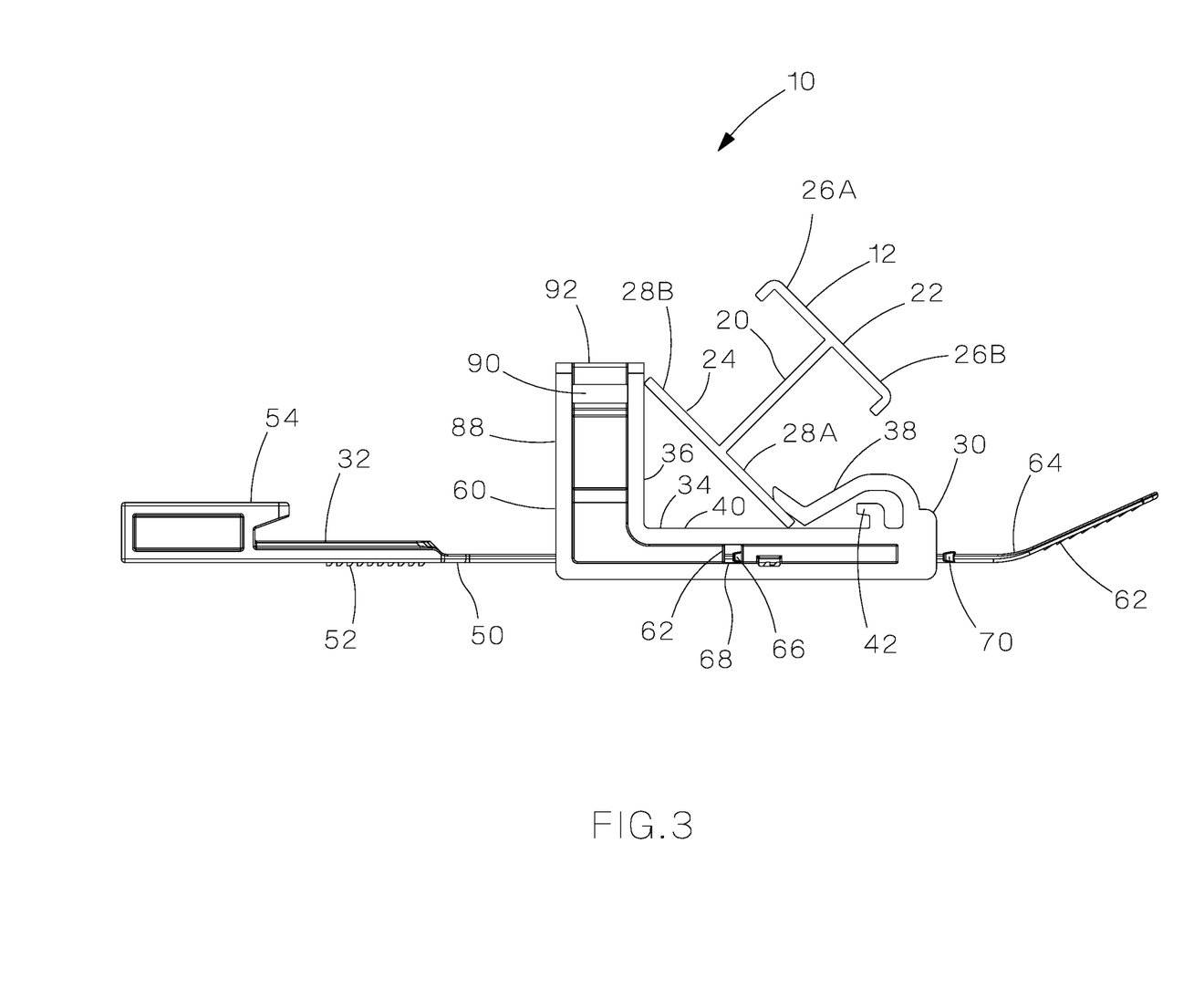
FIG. 3 illustrates a side view of the bracket assembly in FIG. 1 showing the bracket assembly in the initial pre-assembled position and a ladder rung being oriented into the bracket in a pre-installed position.
Figure 4:
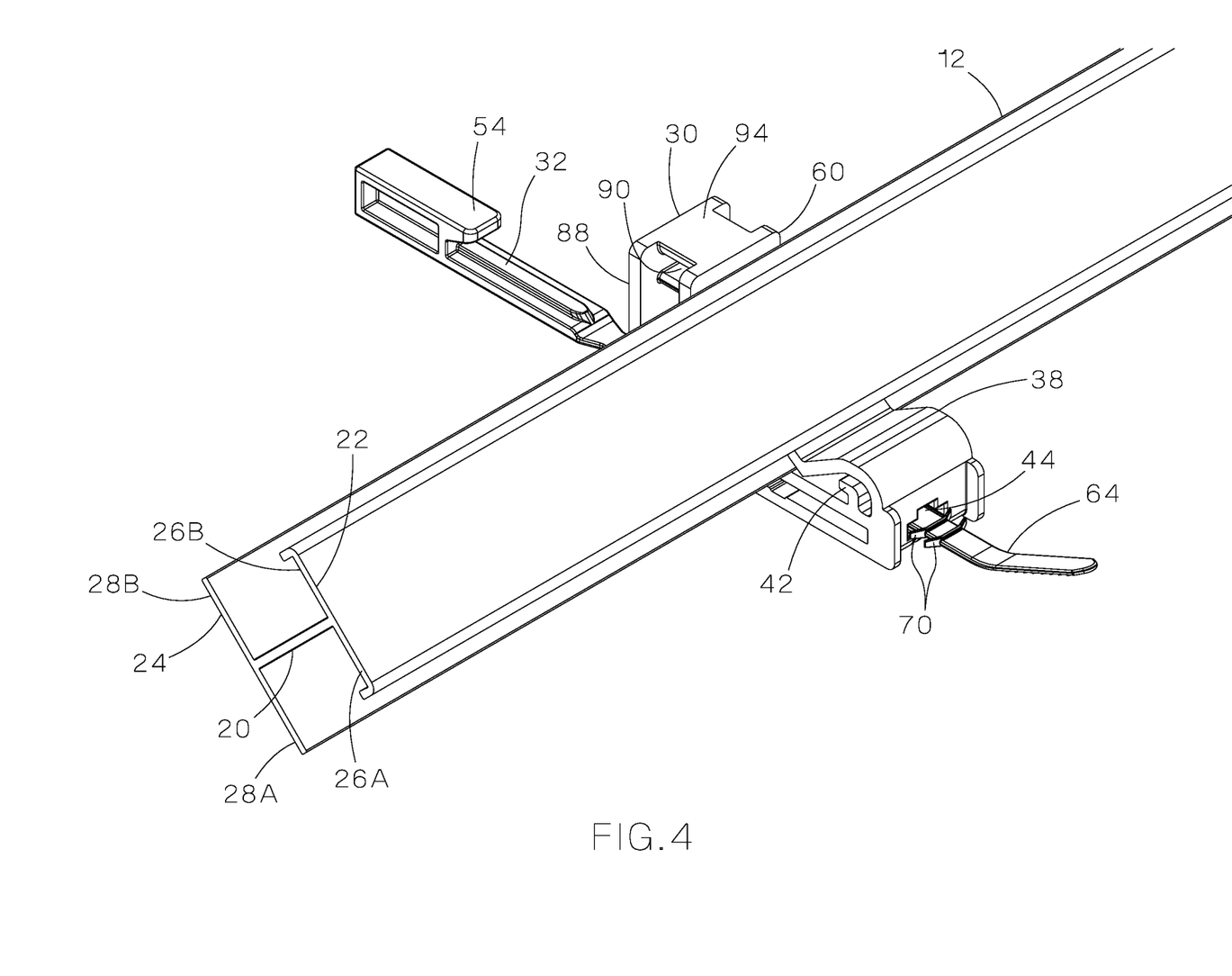
FIG. 4 illustrates a perspective view of FIG. 3 showing the bracket assembly in an initial pre-assembled position and a ladder rung being oriented into the bracket in the pre-installed position.

As shown in FIGS. 3-4, a ladder rung 12 is being oriented into the bracket 30 in a pre-installed position. The lower beam flange 24 is inserted into a retention hook 38 defined along the rung attachment portion 34. The retention hook 38 extends from a planar floor 40 of the rung attachment portion 34 along which the lower beam flange 24 abuts when retained. The retention hook 38 may be biased toward the floor 40 so that as the lower beam flange 24 is inserted into the retention hook 38, the retention hook 38 provides a clamping force when the lower beam flange 24 is seated in the rung attachment portion 34.

A secondary retention flange 42 is formed in the slot beneath the retention hook 38. The secondary retention flange 42 assists in limiting the rotation of the bracket assembly 10 around the ladder rung 12 when the force on the cable exceeds the strength of the main retention hook 38.

Figure 5:
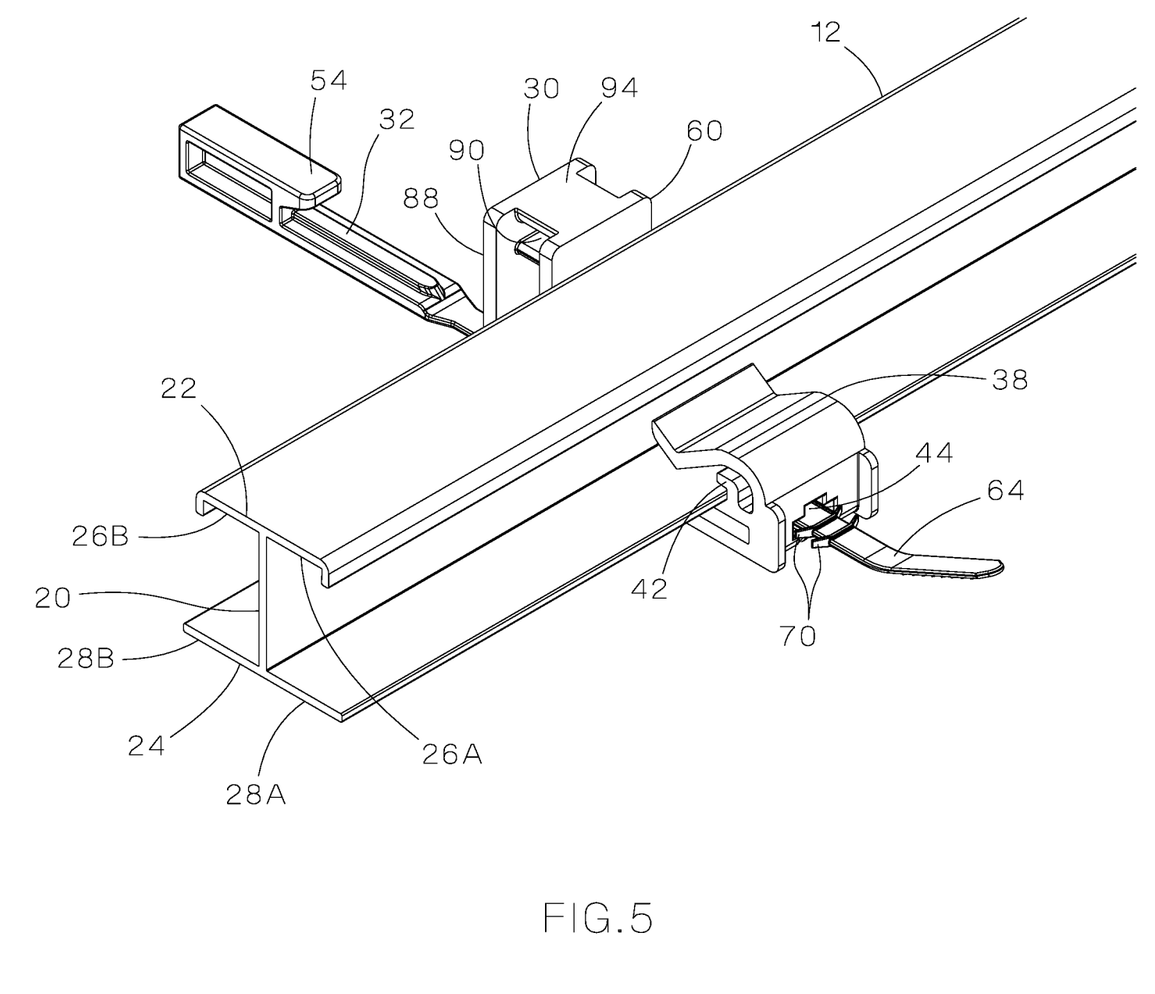
FIG. 5 illustrates a perspective view of the bracket assembly in FIG. 1 showing the ladder rung in an installed position in the bracket and the bracket assembly in the initial pre-assembled position, where the bracket assembly is unlatched.
Figure 6:
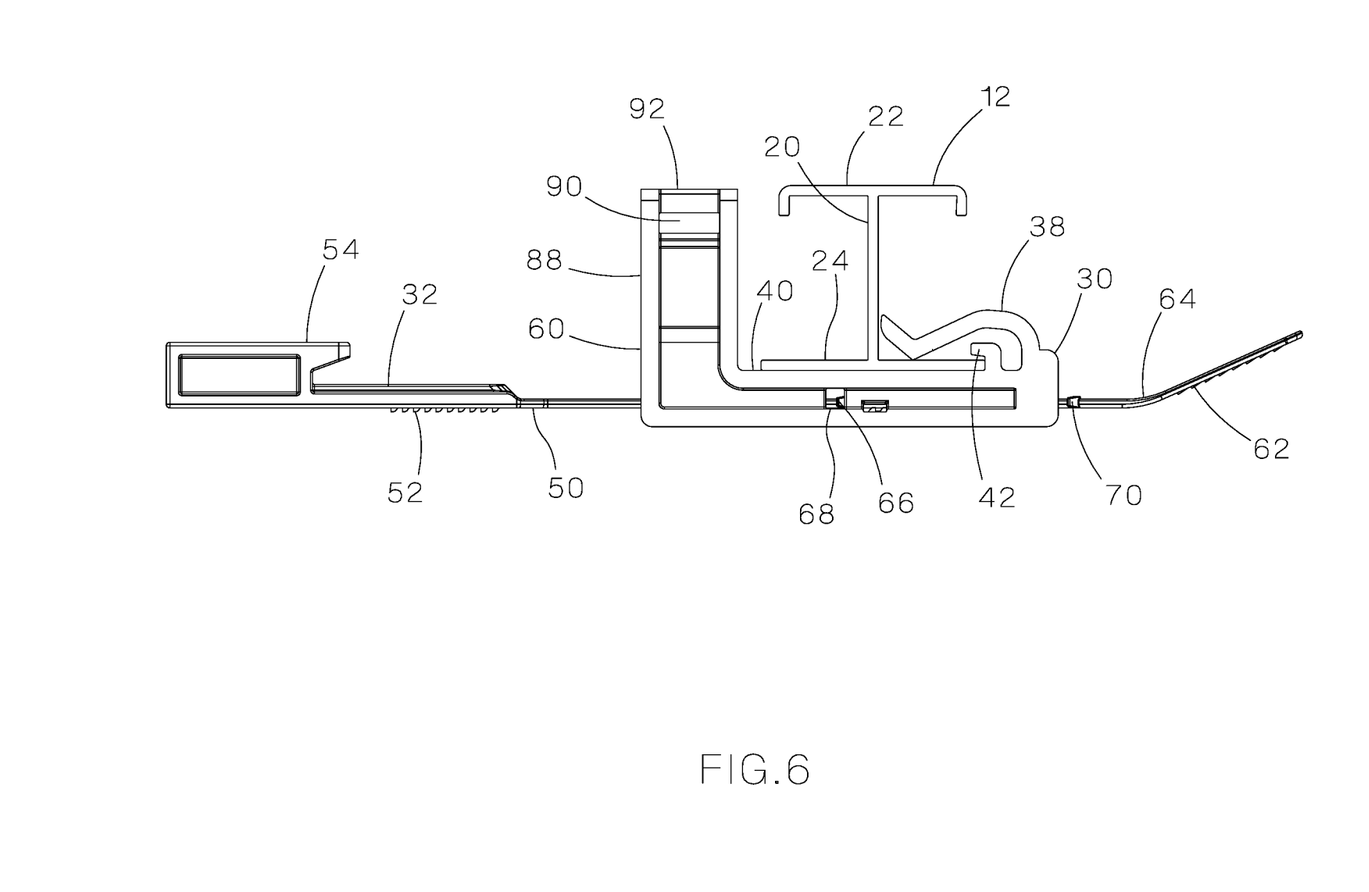
FIG. 6 illustrates a side view of FIG. 5 showing the ladder rung in the installed position in the bracket and the bracket assembly in the initial pre-assembled position.

FIGS. 5-6 show the ladder rung 12 in an installed position in the bracket 10 where the lower beam flange 24 is seated and abuts and is parallel to the floor 40 of the rung attachment portion 34. The lower beam portion 28A is retained by the retention hook 38 and is engaged with the secondary retention flange 42. However, in FIGS. 5-6, the bracket assembly 10 is still in the unlatched position since the lower beam portion 28B is not positively engaged or locked.

The bracket assembly 10 includes a ratchet passageway 44 formed below the floor 40 of the rung attachment portion 34. The ratchet passageway 44 extends through the bracket 30 and receives the tether 32. The tether 32 slides relative to the bracket along the ratchet passageway 44 between an unlatched position and a latched position. FIGS. 5-6 show the initial orientation of the bracket prior to the bracket being latched on the ladder rung 12.

The tether 32 has an elongated tether body 50 with a plurality of ratchet teeth 52 formed to engage and cooperate with teeth in the ratchet passageway 44.

Figure 7:
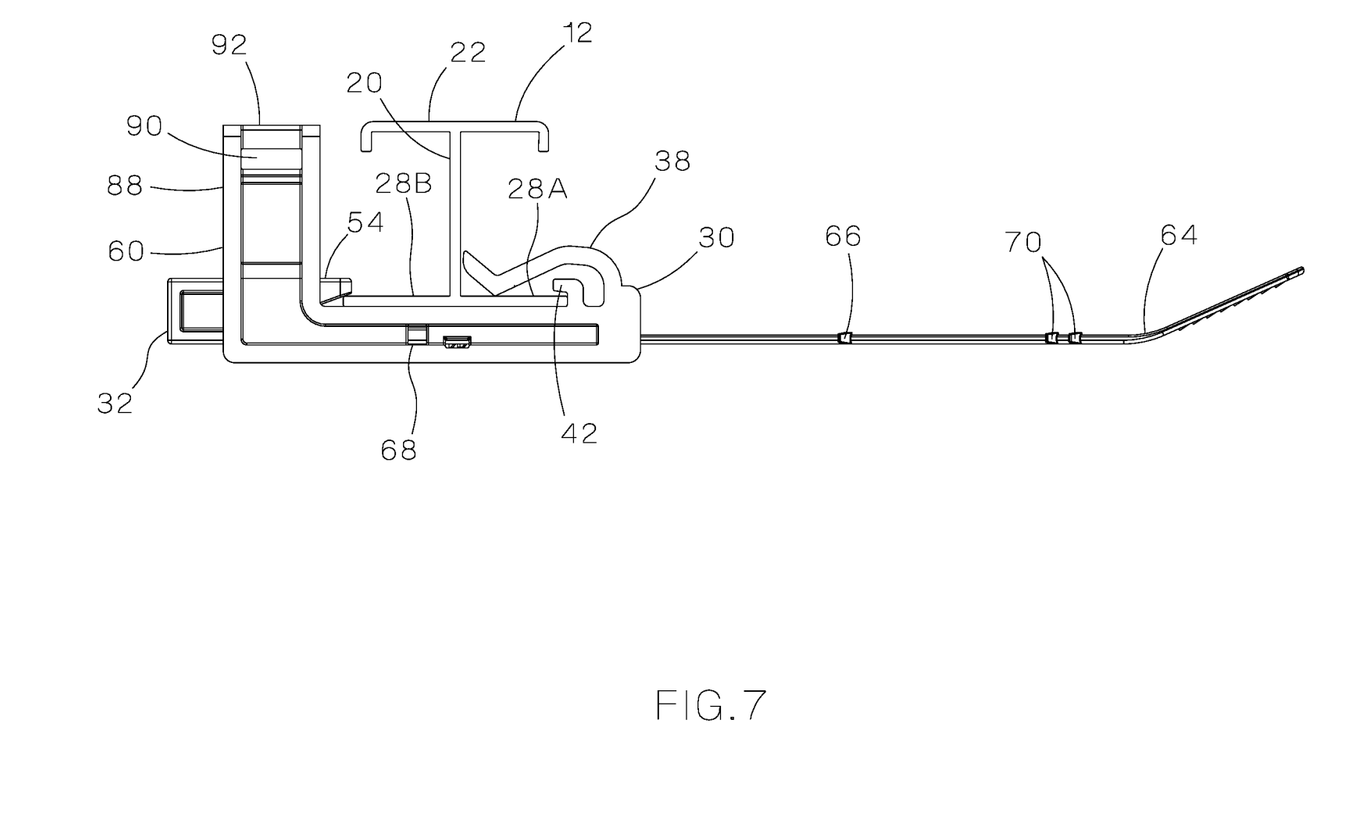
FIG. 7 illustrates a side view of the bracket assembly in FIG. 1 showing the ladder rung in the installed position in the bracket and the bracket assembly in a latched position.
Figure 8:
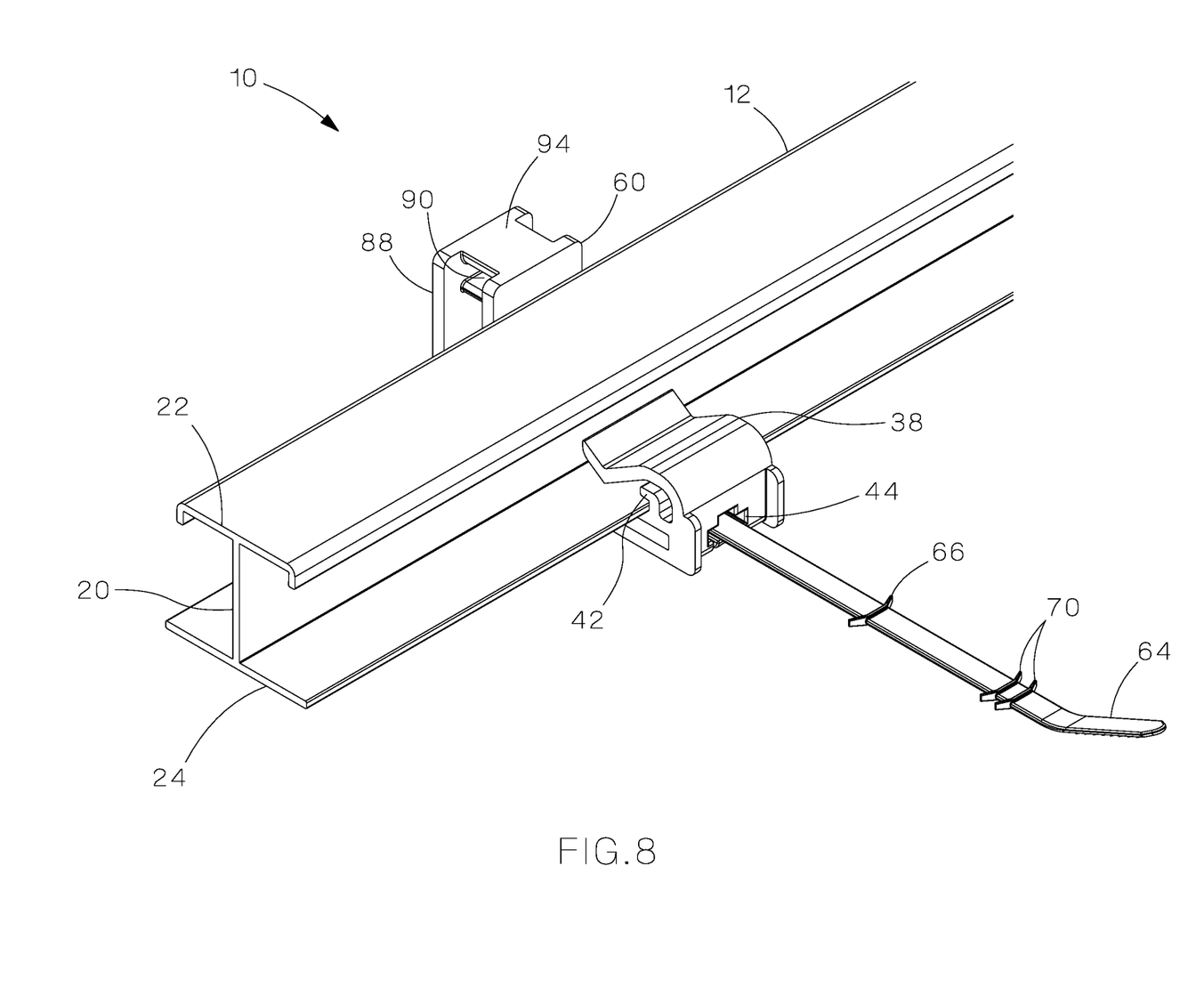
FIG. 8 illustrates a perspective view of FIG. 7 showing the ladder rung in the installed position in the bracket and the bracket assembly in the latched position.

The tether 32 includes a retention pin 54 formed at a first end of the tether body 50. As the tether 32 slides relative to the bracket 30, the retention pin 54 extends through a retention slot 56 in the bracket 30 and protrudes into the rung attachment portion 34 of the bracket. As shown in FIGS. 7-8, in this latched position, the retention pin 54 retains the lower beam portion 28B of the ladder rung 12, thereby locking the bracket assembly 10 to the ladder rung 12. The retention slot 56 is formed parallel to the ratchet passageway 44 and adjacent the rung attachment portion 34. As shown in FIG. 1, the retention slot 56 extends through a cable attachment portion 60 to allow access to the channel 36 in the rung attachment portion 34. A head 58 of the tether 32 abuts the cable attachment portion 60 along an outer surface opposite the channel 36.

The bracket 30 and tether 32 are pre-assembled to allow the bracket assembly 10 to be quickly positioned. FIGS. 1-2 shows the bracket 30 and tether 32 in the pre-assembled position. For example, the tether 32 may be installed in the bracket 30 at a factory prior to being provided to customers. The bracket assembly 10 can then be easily locked by hand or using a tool. For example, the tether 32 may be sized similar to standard cable ties, and a cable tie gun may be used to tension the tether 32 when the bracket assembly 10 is ready to be attached to the ladder rung 12.

The tether 32 has an initial stop feature 62 that retains the tether 32 in the bracket 30 until the bracket is installed and latched on the ladder rung 12. In one embodiment, the stop feature 62 is a curved tip 64 formed along the end of the tether body 50 opposite the retention pin 54. The curved tip 64 prevents the tether 32 from being pulled out of the ratchet passageway 44 prior to the bracket assembly 10 being installed on the ladder rung 12. The curved tip 64 also allows the operator to easily grip the end and pull the tether 32 quickly through the ratchet passageway 44.

In another embodiment, the tether 32 has a locking tab 66 extending from each side of the tether body 50. The locking tab 66 cooperates with a stop pocket 68 formed along the ratchet passageway 44 to retain the tether 32 in the bracket. The stop pocket 68 extends transverse to the ratchet passageway 44. As shown in FIG. 2, in the pre-installed position, the locking tab 66 is engaged in the stop pocket 68. The locking tab 66 prevents the tether 32 from moving to the latched position until the tether 32 is pulled or tightened. When the tether 32 is pulled, the locking tab 66 deflects and exits the stop pocket 68 and is pulled though the ratchet passageway 44, as shown in FIGS. 7-8. The tether body 50 may include additional lock tabs 70 extending from each side adjacent the tip. The additional lock tabs 70 provide an additional stop feature to prevent the tether 32 from being removed from the bracket 30 prior to use.

When the tether 32 is pulled through the ratchet passageway 44, the ratchet teeth 52 on the tether 32 engage teeth in the ratchet passageway 44 to prevent the tether 32 from being removed and to maintain the bracket assembly 10. In the latched position, the retention pin 54 on the tether 32 overlaps the lower beam portion 28B opposite the retention hook 38.

Figure 9:
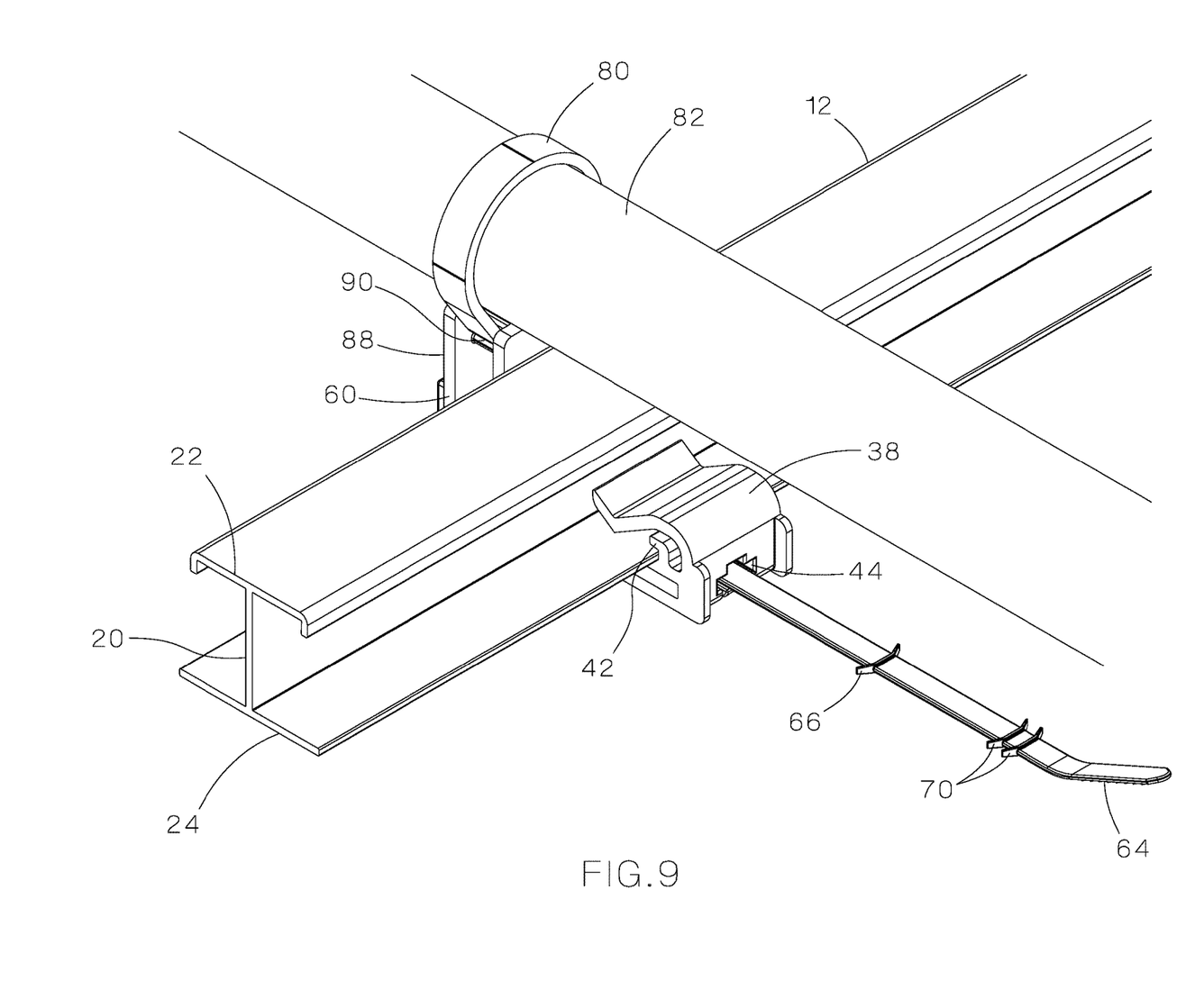
FIG. 9 illustrates a perspective view of the bracket assembly in FIG. 1 with a cable tie installed and secured to a cable, while the ladder rung is in the installed position in the bracket and the bracket assembly is in the latched position.
Figure 10:
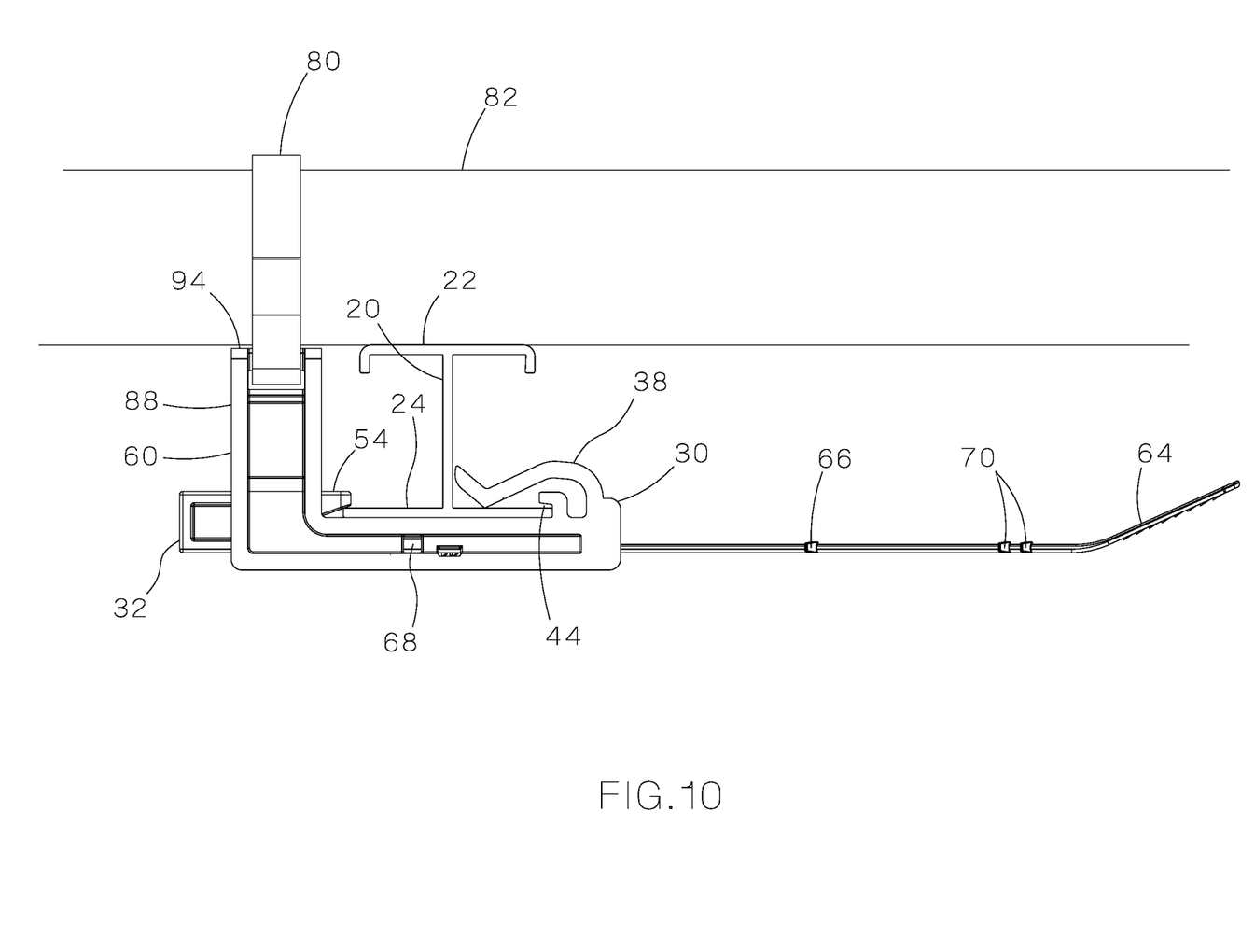
FIG. 10 illustrates a side view of FIG. 9 with the cable tie installed and secured to a cable, while the ladder rung is in the installed position in the bracket and the bracket assembly is in the latched position.

Once the bracket assembly 10 is latched to the ladder rung 12, a cable tie 80 may be secured to the bracket assembly 10 to attach a cable 82, as shown in FIGS. 9-10. The cable attachment portion 60 allows the cable tie 80 to be quickly and easily secured to the cable 82 at 90-degrees. The cable 82 is generally perpendicular to the ladder rung 12.

The cable attachment portion 60 has a cable attachment arm 88 that extends upward from the rung attachment portion 34 toward the upper beam flange 22 of the ladder rung 12. The cable attachment arm 88 has a cable tie aperture 90 extending through the arm 88 and sized to receive the cable tie 80. The cable tie aperture 90 is configured to be generally parallel to the ladder rung 12 so the cable tie 80 can be secured concentric to a circumference of the cable 82, and the cable tie 80 is oriented perpendicular, or 90-degrees to the length of the cable. The cable 82 is oriented generally perpendicular to the ladder rung 12.

The length of the cable attachment portion 60 is sized so that when the bracket assembly 10 is attached to the ladder rung 12, a distal end 92 of the arm 88 is generally level with the upper beam flange 22 of the ladder rung 12, as shown in FIG. 10. For example, the distal end 92 of the cable attachment arm 88 may have an upper surface 94 being generally flat or planar and coplanar with of the upper beam flange 22 of the ladder rung 12 so that the upper surface 94 provides additional support for the cable 82. The cable tie aperture 90 is offset below the upper surface 94.

Figure 11:
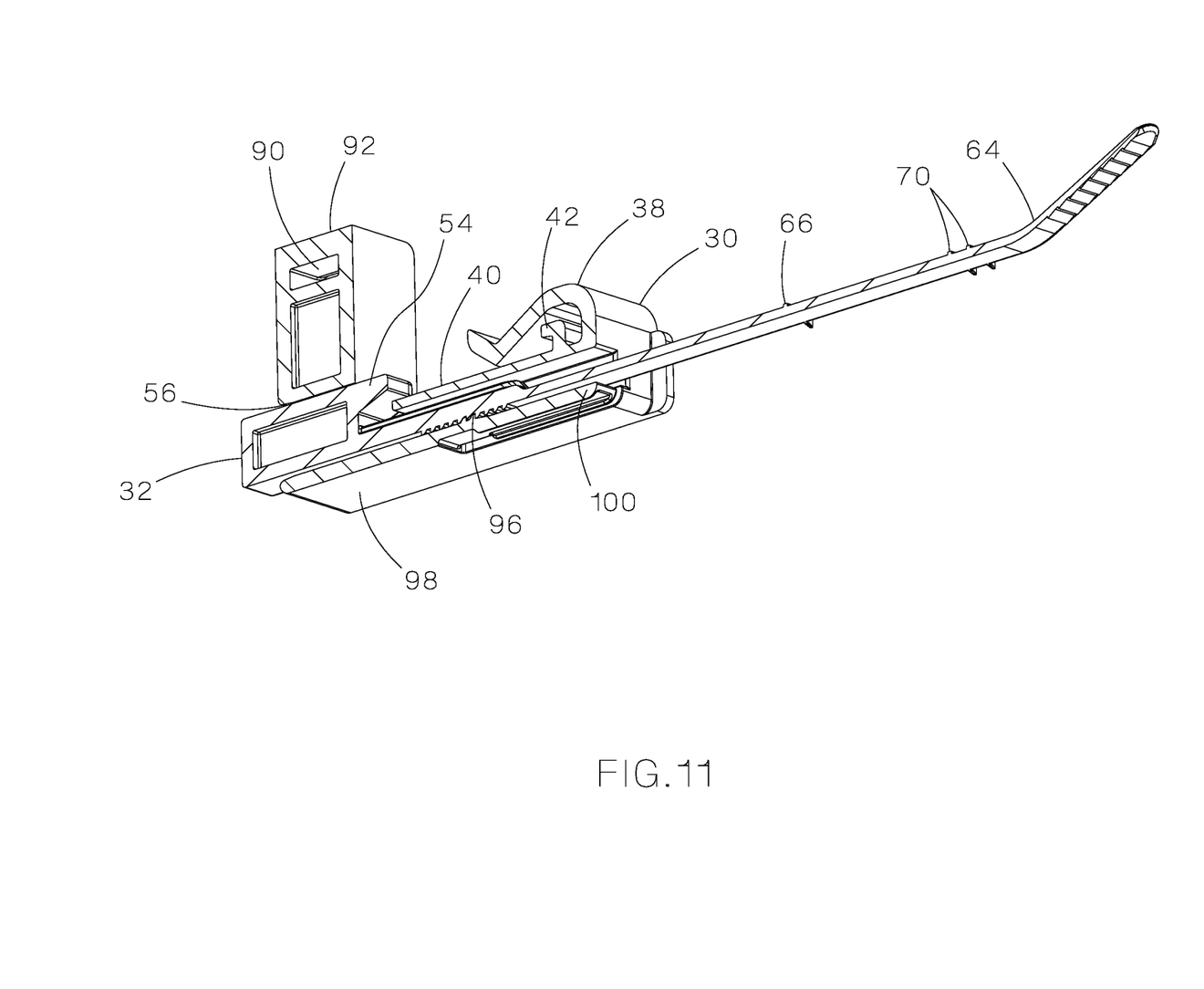
FIG. 11 illustrates a section view of the bracket assembly in FIG. 1 in the latched position.

FIG. 11 shows a section view of the bracket assembly 10 after the tether 32 is pulled to the latched position and the retention pin 54 extends through the retention slot 56 in the bracket 30 to engage rung attachment portion 34. Inner teeth 96 formed within the ratchet passageway 44 engage the ratchet teeth 52 on the tether body 50 to maintain the bracket assembly 10 in the latched position and keep the ladder rung 12 secured to the bracket assembly 10 by the tether retention pin 54. The bracket assembly 10 may be unlocked with the bracket beam 98. A free end 100 of the bracket beam 98 can be pivoted away from the floor 40 of the rung attachment portion which disengages the inner teeth 96 from the ratchet teeth 52 on the tether body 50. The tether 32 can then be removed from the bracket 30 allowing the bracket assembly 10 to be removed or repositioned along the ladder rung 12.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A bracket assembly for securing a cable to a ladder rung having first and second beam flanges extending from a beam web, the bracket assembly comprising:
   a bracket having a rung attachment portion configured to receive the second beam flange and a cable attachment portion extending from the rung attachment portion for securing a cable tie;
   a tether connected to the bracket and slidable between an initial position and a latched position, the tether having a retention pin, wherein in the latched position, the retention pin moves into engagement with the rung attachment portion, to engage the second beam flange thereby latching the ladder rung to the bracket assembly;
   wherein the bracket has a ratchet passageway formed below the rung attachment portion and extending through the bracket to receive the tether; and
   wherein the bracket has a retention slot formed parallel to the ratchet passageway and adjacent to the rung attachment portion, in the latched position, the retention pin of the tether extends through the retention slot to retain a second beam flange of the ladder rung thereby latching the bracket assembly to the ladder rung.

2. The bracket assembly of claim 1, wherein the cable attachment portion has an arm extending toward a first beam flange of the ladder rung, wherein the arm has a cable tie aperture extending through the arm and sized to receive a cable tie.

3. The bracket assembly of claim 2, wherein the cable tie aperture is configured to be generally parallel to the ladder rung so the cable tie is secured concentric to a circumference of the cable where the cable is oriented generally perpendicular to the ladder rung.

4. The bracket assembly of claim 1, wherein the rung attachment portion has a retention hook, the retention hook defining a slot in which a first portion of the second beam flange is configured to be inserted, wherein the retention pin of the tether engages a second portion of the second beam flange.

5. The bracket assembly of claim 1 wherein the tether has a tether body having a plurality of teeth formed to engage the ratchet passageway.

6. A bracket assembly for securing a cable to a ladder rung having first and second beam flanges extending from a beam web, the bracket assembly comprising:
   a bracket having a rung attachment portion configured to receive the second beam flange and a cable attachment portion extending from the rung attachment portion for securing a cable tie;
   a tether connected to the bracket and slidable between an initial position and a latched position, the tether having a retention pin, wherein in the latched position, the retention pin moves into engagement with the rung attachment portion, to engage the second beam flange thereby latching the ladder rung to the bracket assembly;
   wherein the bracket has a ratchet passageway formed below the rung attachment portion and extending through the bracket to receive the tether; and
   wherein the tether has at least one locking tab extending from each side of a tether body, the locking tab cooperating with the bracket to prevent the tether from being removed from the bracket.

7. The bracket assembly of claim 6, wherein the bracket has a stop pocket extending transverse to the ratchet passageway, wherein in the unlatched position, the locking tab is engaged in the stop pocket thereby preventing the tether from moving to the latched position until tightened.

8. The bracket assembly of claim 6, wherein the cable attachment portion has an aim extending toward a first beam flange of the ladder rung, wherein the arm has a cable tie aperture extending through the arm and sized to receive a cable tie.

9. The bracket assembly of claim 8, wherein the cable tie aperture is configured to be generally parallel to the ladder rung so the cable tie is secured concentric to a circumference of the cable where the cable is oriented generally perpendicular to the ladder rung.

10. The bracket assembly of claim 6, wherein the rung attachment portion has a retention hook, the retention hook defining a slot in which a first portion of the second beam flange is configured to be inserted, wherein the retention pin of the tether engages a second portion of the second beam flange.

11. A bracket assembly for securing a cable to a ladder rung having upper and lower beam flanges each having first and second beam portions on opposite sides of a vertical beam web form, the bracket assembly comprising:
   a bracket comprising:
   a rung attachment portion having a retention hook for retaining a firstb eam portion of the lower beam flange of the ladder rung;

a ratchet passageway formed below the rung attachment portion and extending through the bracket;

a retention slot formed parallel to the ratchet passageway and adjacent the rung attachment portion;

a cable attachment portion extending from the rung attachment portion for securing a cable tie and securing a cable generally perpendicular to the ladder rung; and a tether slidable relative to the bracket between an unlatched position and a latched position, the tether comprising:

a tether body having a plurality of teeth formed to engage ratchet passageway;

a tether retention pin formed at a first end of the tether body;

wherein the tether body is installed through the ratchet passageway and in the latched position, the tether retention pin extends through the retention slot in the bracket to retain a second beam portion of the lower beam flange of the ladder rung, thereby latching the bracket assembly to the ladder rung; and wherein the tether has at least one locking tab extending from each side of a tether body, the locking tab cooperating with the bracket to prevent the tether from being removed from the bracket.

12. The bracket assembly of claim 11, wherein the cable attachment portion has an arm extending toward the upper beam flange of the ladder rung, wherein the arm has a cable tie aperture extending through the arm and sized to receive the cable tie.

13. The bracket assembly of claim 12, wherein the cable tie aperture is configured to be generally parallel to the ladder rung so the cable tie is secured concentric to a circumference of the cable where the cable is oriented generally perpendicular to the ladder rung.

14. The bracket assembly of claim 11, wherein the bracket has a stop pocket extending transverse to the ratchet passageway, wherein in the unlatched position, the locking tab is engaged in the stop pocket thereby prevent the tether from moving to the latched.

* * * * *